Figure 1:
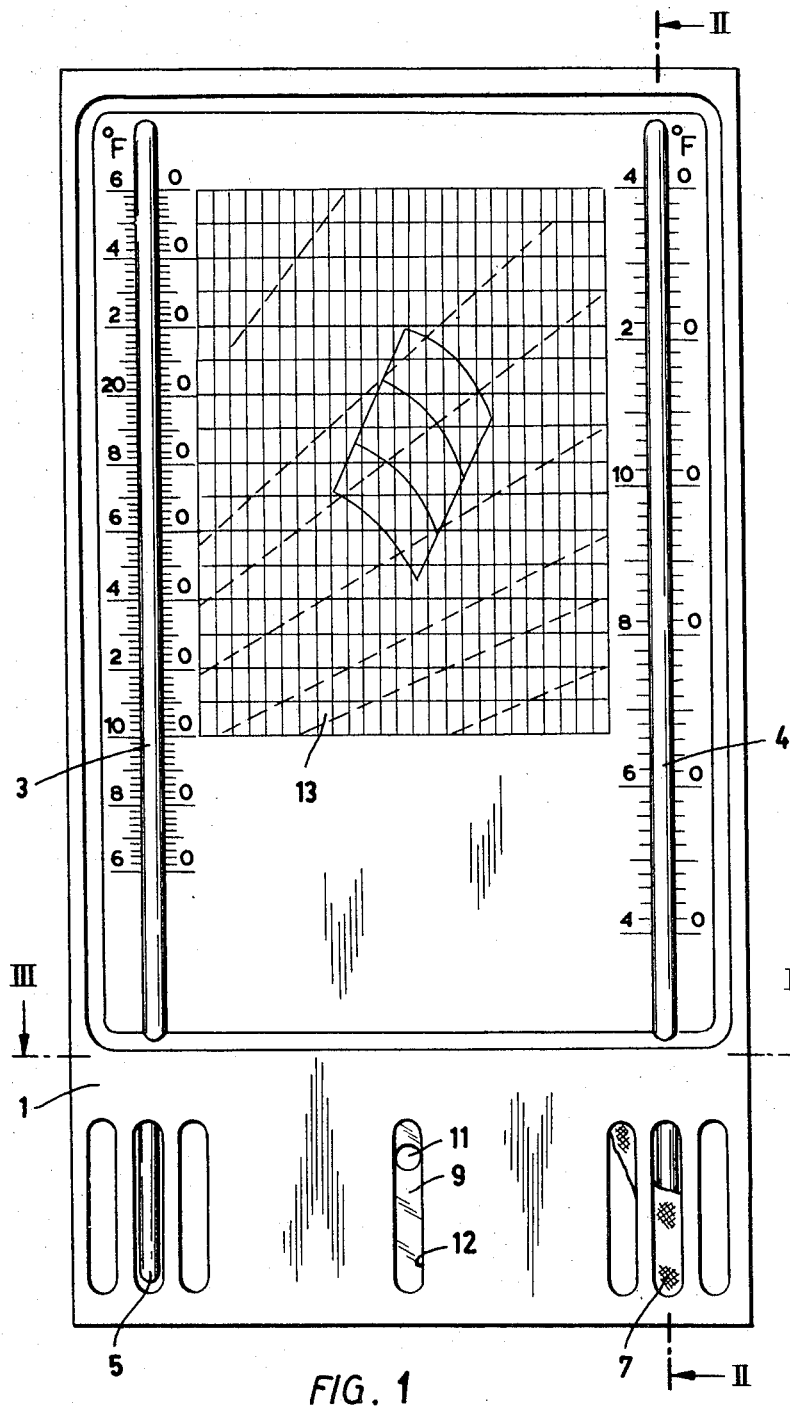

United States Patent

[11] 3,583,222

[72] Inventor Erkki Aikas
 Melojantie 2A, Helsinki 20, Finland
[21] Appl. No. 805,633
[22] Filed Mar. 10, 1969
[45] Patented June 8, 1971
[32] Priority Mar. 11, 1968
[33] Finland
[31] 654/68

[54] DEVICE FOR MEASUREMENT OF THE WET-TEMPERATURE OF THE AIR IN A STEAM BATH
2 Claims, 4 Drawing Figs.

[52] U.S. Cl. .................................................. 73/338
[51] Int. Cl. ............................................. G01n 25/62
[50] Field of Search .................................. 73/338.6, 338.3, 338

[56] References Cited
UNITED STATES PATENTS
1,620,864  3/1927  Benesh ........................ 73/338.6
2,107,077  2/1938  Magner ........................ 73/338.6

Primary Examiner—Louis R. Prince
Assistant Examiner—Denis E. Corr
Attorney—Stevens, Davis, Miller & Mosher ABSTRACT: A device for measuring the wet temperature of the air particularly in a steam bath comprising a frame mounting a thermometer and a water container on a room wall, a wet sock or wick connects the water container to the measuring end of the thermometer and this measuring end and wet sock project into a vertically extending channel through which the room air flows. The water container extends into this same channel in order to create a throttling space near the measuring end to accelerate the velocity of the air passing through the channel and that area.

DEVICE FOR MEASUREMENT OF THE WET-TEMPERATURE OF THE AIR IN A STEAM BATH

The present invention concerns a measuring device particularly for steam baths for measuring the wet temperature of the air. It comprises a frame carrying a thermometer and a water container, a wet sock, which connects the measuring end of the thermometer with the water container and a mainly vertical channel for the flow of surrounding air and into which the thermometer end with its wet sock extends.

The device is intended for use in steam baths for determining the most suitable bathing conditions from a heat-physiological point of view. The measuring of the heat in steam baths is now generally done by measuring only the dry temperature of the bath room air. The heat-physicalogical effects of the bathing depends, however, decidedly also on the humidity of steam room air.

There are several previously known devices for measurement of the temperature of humid air. When measuring the wet-temperature with a thermometer the thermometer bulb is provided with a so-called wet sock and the velocity of the air at the thermometer bulb should be greater than a certain minimum velocity in order to obtain reliable results in practice. On this account it has been necessary to provide the device with a small blower which creates the required air velocity or to swing the device in the air to create the air velocity effect in question. Naturally, the use of a blower makes the device expensive and the swinging of the device by hand is tedious.

The aim of the present invention is to avoid these inconveniences and to create a measuring device which does not require the use of a special blower or the swinging of the gauge but still gives enough reliable enough measurements This is achieved with the present invention by having the airflow channel located inside the frame and directly inside the sidewall which rests against the bath room wall. In order to create the required air velocity past the thermometer end for measuring of the wet temperature the vertical airflow along the wall is throttled at a known proper throttling point.

The measuring device according to this invention takes advantage of the downwardly flowing air along the bathroom walls during heating. It has been observed, that by a suitable design of the frame of the measuring device it is possible to secure proper functioning of the measuring device from the downwardly flowing air in sufficient quantity and with sufficient speed past the thermometer end. By locating the throttling point in the airflow channel at the measuring end of the thermometer the speed of the air can be accelerated, thus insuring that a sufficient air speed is obtained past the thermometer measuring end even when the device is mounted on a wall along which said downward flow is weakest.

The invention is described in the following in more detail with reference to accompanying drawings. Because a wet-temperature measuring device according to this invention is in practice generally used together with a thermometer for measuring the dry temperature (in order to obtain a complete picture of the bathing conditions), the embodiment of the inventive idea is pictured as a combined dry- and wet-temperature measuring device.

Figure 2:
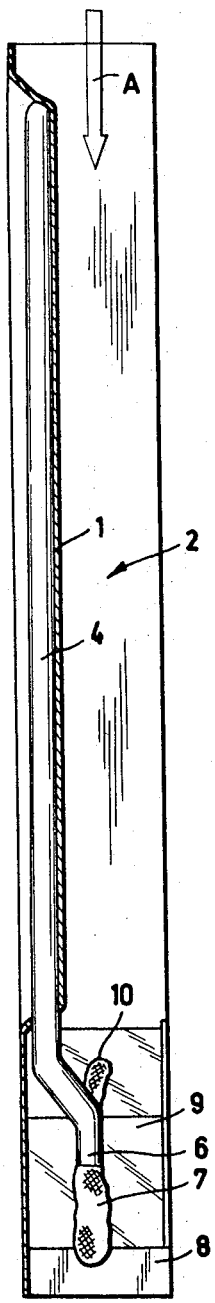
Figure 3:
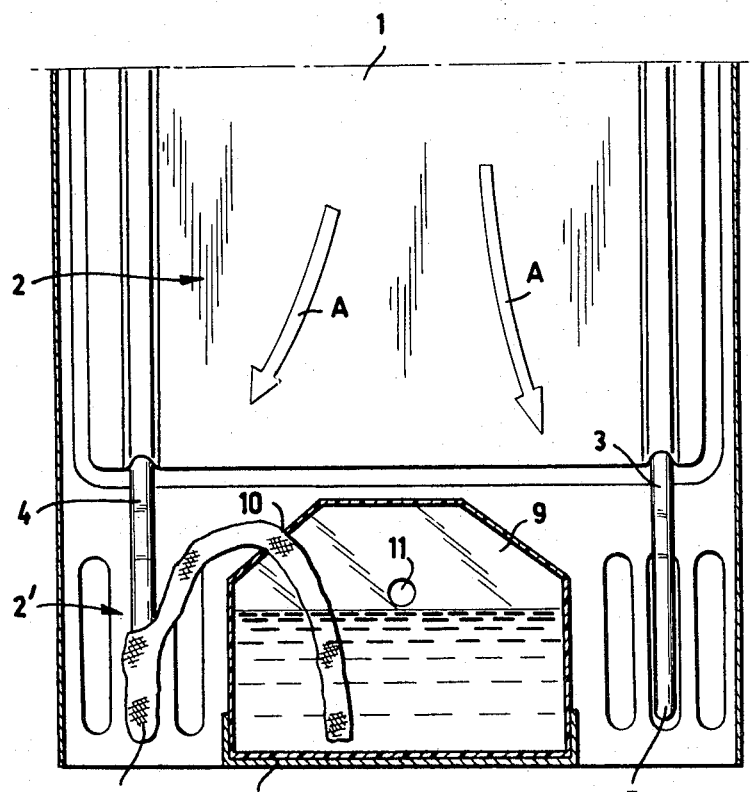
Figure 4:
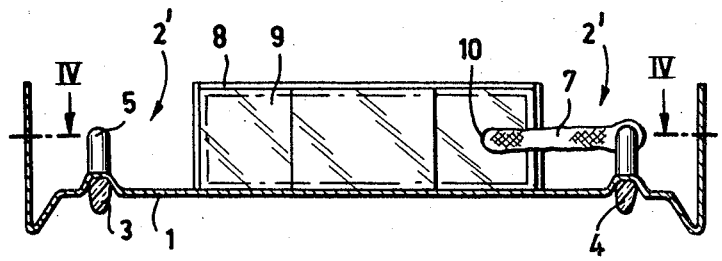

In the drawings:

FIG. 1 shows a front view of the measuring device,
FIG. 2 shows a section along the line II–II in FIG. 1,
FIG. 3 shows a section along the line III–III in FIG. 1, and
FIG. 4 shows a section along the line IV–IV in FIG. 3.

The measuring device pictured in the drawings comprises a sheet metal frame 1, which is given a boxlike shape with rectangular cross section and open longitudinal ends thus forming a flow channel 2. To the front side of the frame is attached on one side a thermometer 3 for measuring the dry temperature of the air and on the opposite side a thermometer 4 for measuring the wet temperature of the air. The lower parts 5 and 6 of both thermometers 3 and 4, which act as measuring ends, are bent backwards to extend through holes in the frontplate and behind it to project into the flow channel, as is best seen in FIG. 2.

The measuring end 6 of the wet-temperature thermometer 4 is covered by a wetting element, a wet sock 7. A supporting element 8 is attached to the rear side of the front plate in the middle of the flow channel for carrying the water container 9 of plastic material. In the upper sidewall of the water container is a hole 10 to permit entry of the wet sock and in the front wall of said container is a hole 11 opposite an opening 12 in the front wall of the frame allowing the filling of the container with water.

Thus, the measuring end 6 of the wet thermometer 4 with the wet sock 7 is located in the flow channel 2, which directs the downwardly flowing air which is moving along the bathroom wall without obstruction into contact with the measuring end of the thermometer 4. Due to the feature that the water container is located in the flow channel a throttling space 2' is created at the thermometer measuring end and thus accelerates the air speed at this point. Because a continuous heat consuming evaporation occurs from the water container the sidewalls of the container are kept cooler than the air, further boosting the acceleration of the flow. Thus the creation and the maintenance of the air speed is secured to insure the proper function of the measuring device.

As shown in the FIGS. 2 and 4, the measuring end of the wet thermometer 4 with its wet sock is located below the water surface in the container. This arrangement provides the advantage that the wet sock is continuously sucking water from the container, and this water is dripping off the measuring end and is thus rinsing the wet sock to remove salts gathered on it from the container water. This allows the use of ordinary water instead of distilled without notable disadvantage.

In the pictured embodiment a diagram 13 is attached to the front surface of the device, enabling observation of the dry and wet temperatures to determine the prevailing bathing conditions and the necessity of suitable regulation.

The drawings and the description are only intended to illustrate a preferred embodiment of the invention. The scope of the invention is, of course, only limited by the appended claims.

What I claim is:

1. A device for measuring the wet temperature of air, particularly in a steam bath, comprising:
   a. a frame having at least a front face, and two sidewall portions, said frame adapted for mounting on a wall so that the sidewall portions maintain the front face in spaced relationship from the wall, said frame carrying a thermometer and a water container within the area between the front face and the wall;
   b. a substantially vertical airflow channel bordered by the front face and said sidewall portions;
   c. a wet sock connected between said water container and the measuring end of said thermometer, said wet sock and measuring end extending into said channel;
   d. said water container extending into said channel so that when said frame is mounted on the wall a throttling space is created near said measuring end to accelerate the velocity of the air passing therethrough.

2. The device of claim 1 wherein said water container is shaped with at least one slanting wall to accelerate the velocity of the air in the channel.